(12) United States Patent
Sawano

(10) Patent No.: US 7,139,163 B2
(45) Date of Patent: Nov. 21, 2006

(54) SOLID ELECTROLYTIC CAPACITOR

(75) Inventor: Takeshi Sawano, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 11/260,283

(22) Filed: Oct. 27, 2005

(65) Prior Publication Data

US 2006/0098393 A1 May 11, 2006

(30) Foreign Application Priority Data

Oct. 28, 2004 (JP) ............................. 2004-313508

(51) Int. Cl.
*H01G 4/228* (2006.01)
*H01G 9/00* (2006.01)
(52) U.S. Cl. ...................... 361/540; 361/533; 361/528
(58) Field of Classification Search ................ 361/523, 361/522, 528–529, 532–534, 535, 540–541; 29/25.03
See application file for complete search history.

(56) References Cited

U.S. PATENT DOCUMENTS 5,377,073 A * 12/1994 Fukaumi et al. ............ 361/540
6,819,546 B1 * 11/2004 Kuriyama ................... 361/535
6,912,117 B1 * 6/2005 Arai et al. ................... 361/523

FOREIGN PATENT DOCUMENTS

JP  2004-172527  6/2004

* cited by examiner

*Primary Examiner*—Eric W. Thomas
(74) *Attorney, Agent, or Firm*—Hamre, Schumann, Mueller & Larson, P.C.

(57) ABSTRACT

A mold member 5 packaging a capacitor element 2 is in the form of a generally rectangular parallelepiped whose length L is greater than the width W and the height H. The mold member 5 includes an opposite pair of side surfaces extending in the direction of the length L, and an anode lead terminal 3 is arranged at an anode-side one 5a of the longitudinally-extending side surfaces, whereas a cathode terminal 4 is arranged at a cathode-side one 5b of the longitudinally-extending side surfaces. The chip body 6 is in the form of a generally rectangular parallelepiped elongated in the direction of the length L of the mold member 5. The lead terminals 3 and 4 are elongated in the direction of the length L of the mold member 5. Of an opposite pair of longitudinally-extending side surfaces of the chip body 6, an anode side one 6a is provided with a plurality of anode bars 7 juxtaposed and projecting therefrom. The capacitor element 2 is arranged between the lead terminals 3 and 4 so that the orientation C1 corresponds to the direction of the width W of the mold member 5.

6 Claims, 4 Drawing Sheets

SOLID ELECTROLYTIC CAPACITOR

BACKGROUND OF THE INVENTION

1. Field of the Invention

The present invention relates to a solid electrolytic capacitor using valve metal such as tantalum or niobium, and particularly relates to a solid electrolytic capacitor including a pair of lead terminals for mounting the capacitor on a mount object such as a printed circuit board.

2. Description of the Related Art

JP-A-2004-172527, for example, discloses a solid electrolytic capacitor to be mounted on a mount object such as a printed circuit board. For the convenience of explanation, the solid electrolytic capacitor disclosed in the document is shown in FIG. 7 of the present application, and generally indicated by reference sign 31. (The reference sign is added by the applicant of the present application.)

The solid electrolytic capacitor 31 includes a capacitor element 32 comprising a prismatic or columnar porous chip body 36 made by sintering valve metal powder such as tantalum or niobium powder and an anode bar 37 projecting from an end surface of the chip body 36. A dielectric film (not shown) having high insulation property is formed on the surfaces of the metal particles constituting the chip body 36, and a solid electrolytic layer (not shown) is formed on the dielectric film. Further, a cathode film 38 is formed on the solid electrolytic layer at the outer circumferential surface of the chip body 36. An anode lead terminal 33 is fixedly and electrically connected to the anode bar 37, whereas a cathode lead terminal 34 is fixedly and electrically connected to the cathode film 38 on the outer circumferential surface of the chip body 36. The capacitor element 32 is packaged in a generally prismatic mold member 35 made of a thermosetting synthetic resin so that the two lead terminals 33 and 34 are exposed at the bottom surface side. The lead terminals 33 and 34 are soldered onto a printed circuit board, for example.

The size of the mold member 35 is length L×width W×height (thickness) H=about 7.3 mm×about 4.3 mm×about 2.8 mm, and corresponds to the D case size of JIS. Thus, the mold member 35 of the related art is in the form of a generally rectangular parallelepiped (generally prismatic) whose length L is greater than the width W and the height H.

The mold member 35 includes a pair of end surfaces 35$c$ and 35$d$ extending in the width direction, at which the anode lead terminal 33 and the cathode lead terminal 34 are arranged, respectively. The capacitor element 32 is arranged between the lead terminals 33 and 34 so that the direction of projection of the anode bars 37 (orientation C0 of the capacitor element 32) corresponds to the longitudinal direction of the mold member 35 (See FIG. 7).

Recently, a solid electrolytic capacitor having a small size and a large capacitance is strongly demanded, and further, a decrease in not only the equivalent series resistance (ESR) but also in the equivalent series inductance (ESL) is demanded for improving the performance of a capacitor at a high frequency range. The equivalent series inductance increases as the length of the conductor through which current flows increases. On the other hand, the equivalent series resistance is generally inversely proportional to the surface area of a portion of the solid electrolytic layer which does not come into contact with the dielectric film (surface area of the non-contact portion). In the prior art solid electrolytic capacitor 31, the surface area of the non-contact portion is generally equal to the outer surface area of the chip body 36.

As will be understood from the above description, to reduce the equivalent series inductance of the solid electrolytic capacitor 31, the distance between the lead terminals 33 and 34 through which current flows need be shortened as much as possible. However, in the prior art solid electrolytic capacitor 31, the lead terminals 33 and 34 are arranged respectively at opposite end surfaces 35$c$ and 35$d$ extending in the width direction of the mold member 35 (i.e. spaced from each other in the longitudinal direction of the mold member 35), and the orientation c0 of the capacitor element 32 corresponds to the longitudinal direction of the mold member 35. With such an arrangement, the distance between the lead terminals 33 and 34 (distance through which current flows) becomes long, whereby the equivalent series inductance is relatively high.

When the distance between the lead terminals 33 and 34 is simply reduced to reduce the distance through which current flows, the overall length of the capacitor element 32 (the distance from the distal end of the anode bar 37 to the end surface of the chip body 36 which is opposite from the anode bar 37) cannot help being shortened, which results in the reduction of the outer dimension (volume) of the chip body 36. In such a case, the outer surface area of the chip body 36 decreases to increase the equivalent series resistance, and the capacitance of the capacitor element 32 decreases.

Moreover, since the outer dimensions of this kind of solid electrolytic capacitor 31 (size of the mold member 35) are standardized, the degree of freedom of design is small. Therefore, in the prior art structure in which the orientation c0 of the capacitor element 32 corresponds to the longitudinal direction of the mold member 35, it is difficult to reduce the distance between the lead terminals 33 and 34 while ensuring the sufficient volume of the chip body 36 of the capacitor element 32.

SUMMARY OF THE INVENTION

An object of the present invention is to solve the problems described above and to provide a solid electrolytic capacitor in which the ESL as well as the ESR can be reduced without departing from the ordinary standard (case standard).

According to a first aspect of the present invention, there is provided a solid electrolytic capacitor comprising: a capacitor element including a chip body made of valve metal, an anode bar projecting from a side surface of the chip body, a cathode film formed on circumference of the chip body via a dielectric film and a solid electrolytic layer; an anode lead terminal connected to the anode bar; a cathode lead terminal connected to the chip body; and a mold member packaging the capacitor element so that the two lead terminals are exposed. The mold member is in the form of a generally rectangular parallelepiped whose length is greater than width and height. The anode lead terminal is arranged at one of two longitudinally-extending side surfaces of the mold member, whereas the cathode lead terminal is arranged at the other one of the two longitudinally-extending side surfaces of the mold member, and the capacitor element is arranged between the lead terminals so that the anode bar projects in the width direction of the mold member.

In the structure of the first aspect, the mold member is in the form of a generally rectangular parallelepiped whose length is greater than the width and the height, and the anode lead terminal is arranged at one of two longitudinally-extending side surfaces of the mold member, whereas the cathode lead terminal is arranged at the other one of the two longitudinally-extending side surfaces of the mold member. Further, the direction of projection of the anode bar of the capacitor element (orientation of the capacitor element) is set to correspond to the direction of the width of the mold member, which is smaller than the length. Therefore, as compared with the prior art structure in which the capacitor element is oriented in the longitudinal direction of the mold member, the distance between the lead terminals, i.e. the distance through which the current flows between the lead terminals can be reduced. As a result, as compared with the prior art structure, the equivalent series inductance (ESL) can be reduced, so that the performance of the solid electrolytic capacitor at a high frequency range can be improved.

In an embodiment of the present invention, the chip body of the capacitor element is in the form of a generally rectangular parallelepiped elongated in the longitudinal direction of the mold member.

In this way, when the chip body of the capacitor element is in the form of a generally rectangular parallelepiped elongated in the longitudinal direction of the mold member, the chip body can be snugly housed in the mold member whose length is greater than the width and the height, while sufficient capacitance of the capacitor element is ensured. Therefore, an increase in size of the capacitor element and the resulting increase in size of the solid electrolytic capacitor can be avoided.

Preferably, each of the lead terminals extends in the longitudinal direction of the mold member, the side surface of the chip body comprises one of two longitudinally-extending side surfaces of the chip body, and a plurality of anode bars are provided to project from the side surface and juxtaposed in the direction in which the side surface extends.

With such a structure, by electrically connecting the plurality of anode bars to the anode lead terminal, the combinations of each anode bar and the chip body are connected in parallel in the equivalent circuit of the solid electrolytic capacitor. Therefore, the combined equivalent series resistance (ESR) and the combined equivalent series inductance (ESL) can be reduced as compared with the prior art structure. Since both of the equivalent series resistance (ESR) and the equivalent series inductance (ESL) between the terminals can be reduced at the same time, the performance of the solid electrolytic capacitor at a high frequency range can be improved.

In another embodiment of the present invention, each of the lead terminals extends in the longitudinal direction of the mold member, the capacitor element includes a plurality of chip pieces juxtaposed in the longitudinal direction of the mold member, and each of the chip pieces is provided with an anode bar projecting therefrom.

In such a structure, the chip body of the capacitor element is made up of a plurality of chip pieces juxtaposed in the longitudinal direction of the mold member, and each of the chip pieces is provided with an anode bar projecting therefrom. Therefore, of the solid electrolytic layer on the chip pieces, the surface area of the portion which does not come into contact with the dielectric film on the valve metal particles is increased by as much as the surface area of the solid electrolytic layer located between adjacent chip pieces. Therefore, the equivalent-series-resistance (ESR) between the lead terminals can be further reduced.

According to a second aspect of the present invention, there is provided a solid electrolytic capacitor comprising: a chip body which is made of valve metal, is formed with a cathode film and includes an anode-side surface from which a plurality of anode bars projects; an anode lead terminal connected to the anode bars; a cathode lead terminal connected to the cathode film of the chip body; and a mold member packaging the chip body so that the lead terminals are partially exposed. The mold member is in the form of a generally rectangular parallelepiped whose length is greater than the width and the height. The anode lead terminal and the cathode lead terminal are arranged, respectively, at an opposite pair of longitudinally-extending side surfaces of the mold member, and the chip body is arranged between the lead terminals so that the anode bars project in the width direction of the mold member.

According to a third aspect of the present invention, there is provided a solid electrolytic capacitor comprising: a plurality of chip bodies each of which is made of valve metal, is formed with a cathode film and includes an anode-side surface from which an anode bar projects; an anode lead terminal connected to the anode bars of the chip bodies; a cathode lead terminal connected to the cathode films of the chip bodies; and a mold member packaging the chip bodies so that the lead terminals are partially exposed. The mold member is in the form of a generally rectangular parallelepiped whose length is greater than the width and the height. The anode lead terminal and the cathode lead terminal are arranged, respectively, at an opposite pair of longitudinally-extending side surfaces of the mold member, and the chip bodies are juxtaposed between the lead terminals in the longitudinal direction of the mold member so that the anode bars project in the width direction of the mold member.

Other features and advantages of the present invention will become clearer from the description given below with reference to the accompanying drawings.

DESCRIPTION OF THE PREFERRED EMBODIMENTS

Preferred embodiments of the present invention will be described below in detail with reference to the drawings (FIGS. 1–6).

Figure 1:
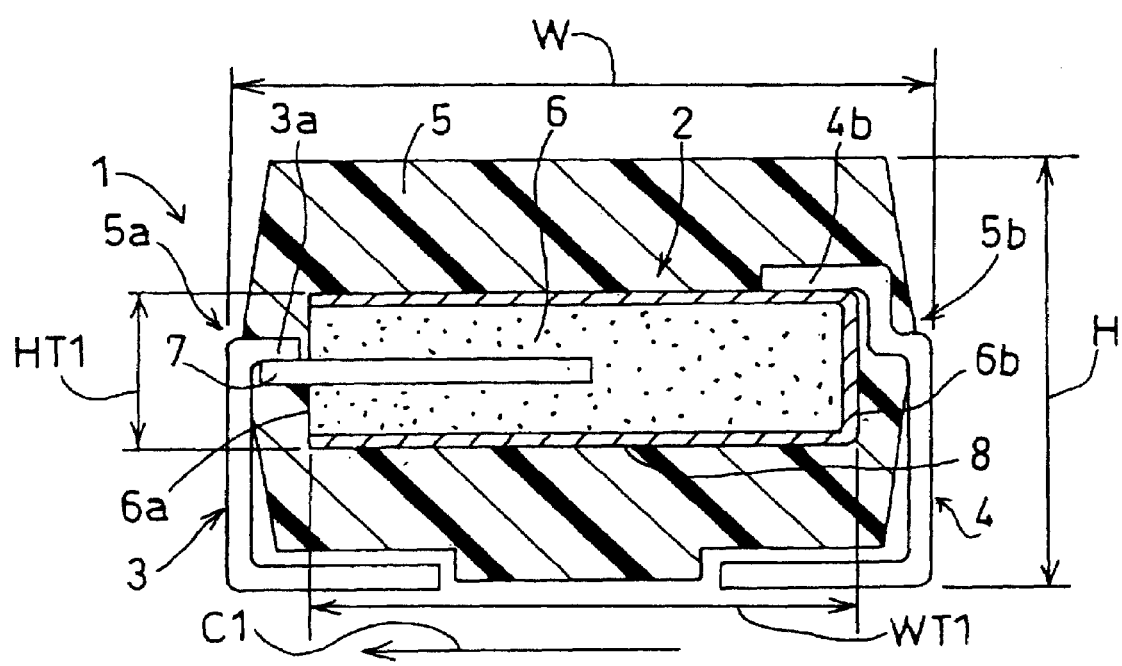
FIG. 1 is a sectional view showing a solid electrolytic capacitor of a first embodiment.
Figure 2:
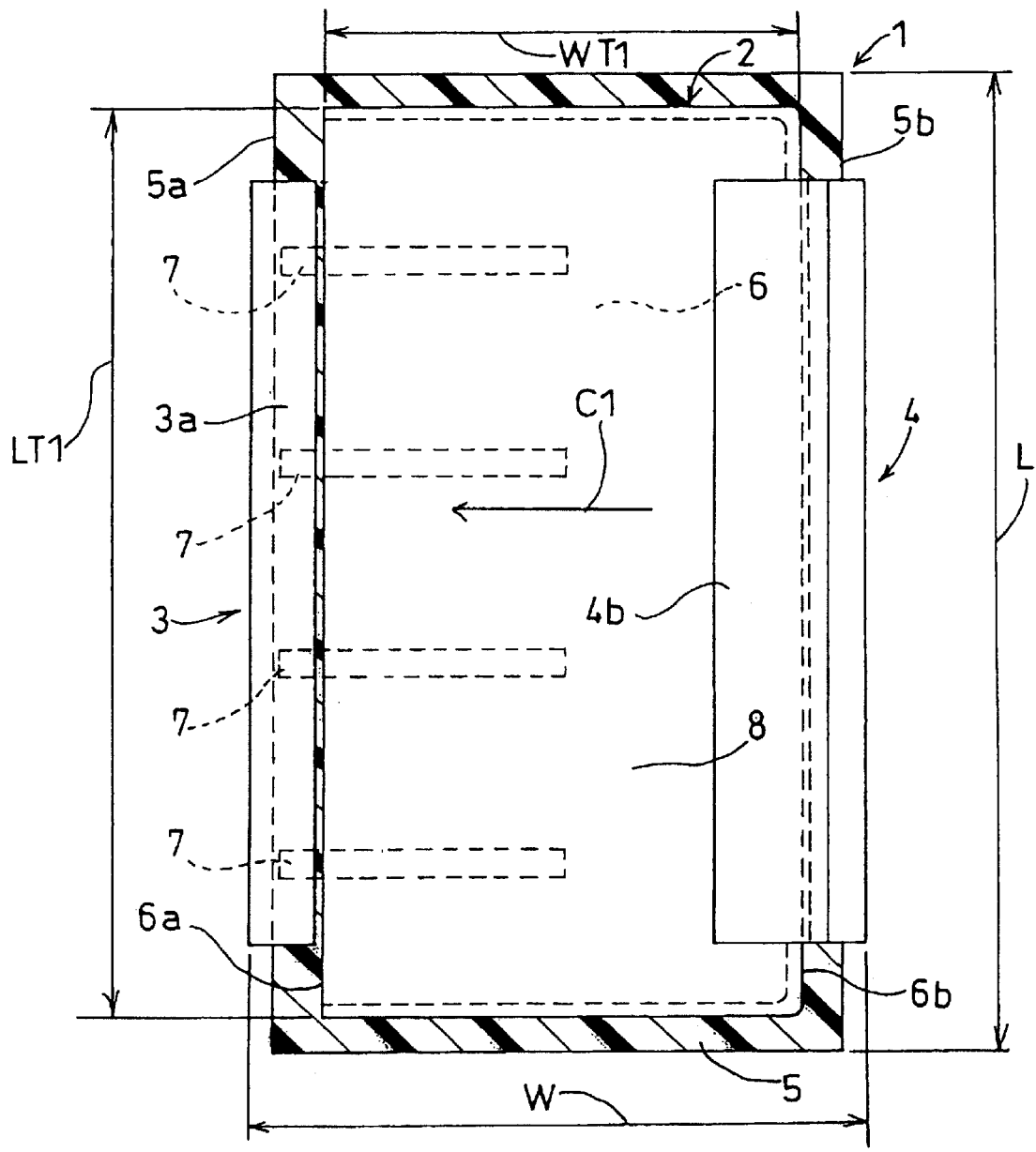
FIG. 2 is a horizontal sectional view showing the solid electrolytic capacitor of the first embodiment.
Figure 3:
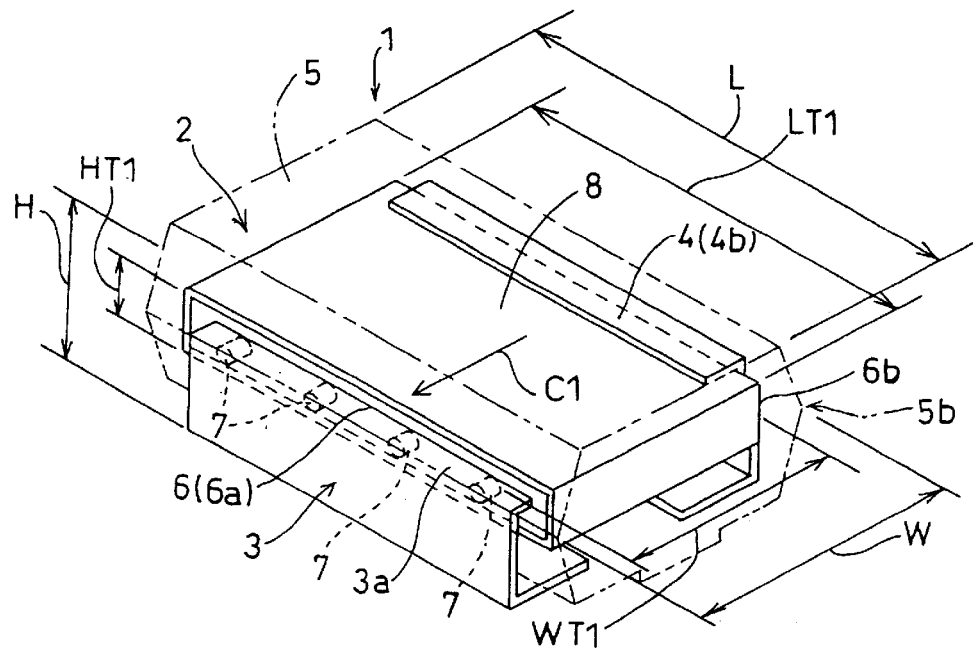
FIG. 3 is a perspective view of the solid electrolytic capacitor of the first embodiment in a state in which the mold member is removed.

FIGS. 1–3 show a first embodiment of the present invention. As shown in FIGS. 1–3, the solid electrolytic capacitor 1 of the first embodiment comprises a capacitor element 2, a pair of lead terminals 3 and 4 made of metal plates, and a mold member 5 made of a thermosetting synthetic resin and packaging the entire capacitor element 2 while exposing the lead terminals 3 and 4 to the outside (bottom surface side in the first example)

The size of the mold member 5 of the first embodiment is length L×width W×height (thickness) H=about 7.3 mm×about 4.3 mm×about 2.8 mm, and corresponds to the D case size of JIS. Thus, the mold member 5 of the first embodiment is in the form of a generally rectangular parallelepiped (generally prismatic) whose length L is greater than the width W and the height H.

The capacitor element 2 comprises a porous chip body 6 which is made by sintering valve metal powder such as tantalum powder and is in the form of a flat plate elongated in the direction of the length L of the mold member 5, and a plurality of anode bars 7 (four wires in the first embodiment) projecting from an anode-side surface 6a extending in the direction of length LT1 of the chip body 6.

A dielectric film (not shown) having high insulation property is formed on the surfaces of the metal particles constituting the chip body 6, and a solid electrolytic layer (not shown) is formed on the dielectric film. Further, a cathode film 7 is formed on the solid electrolytic layer at the outer surfaces of the chip body 6 except for the anode-side surface 6a from which the anode bars 7 project. The size of the chip body 6 of the first embodiment is length LT1×width WT1×height (thickness) HT1=about 6.8 mm×about 3.5 mm×about 1.0 mm.

The anode terminals 7 are juxtaposed in the direction of the length LT1 of the chip body 6 (in the direction in which a pair of side surfaces 6a, 6b extend) (See FIGS. 2 and 3).

The lead terminals 3 and 4 have respective base ends embedded in the mold member 5 and serving as connection portions 3a and 4b connected to the capacitor element 2. The lead terminals 3 and 4 have respective distal ends bent to lie below the mold member 5 (See FIGS. 1 and 3). The distal ends of the lead terminals 3 and 4 are to be soldered onto a printed circuit board, for example.

As shown in FIGS. 2 and 3, the anode lead terminal 3 is arranged to extend along the anode-side surface 5a extending in the direction of length L of the mold member 5, whereas the cathode lead terminal 4 is arranged to extend along the cathode-side surface 5b of the mold member. Accordingly, the connection portions 3a and 4b of the lead terminals 3 and 4 extend in the mold member 5 along the side surfaces 5a and 5b, respectively.

The capacitor element 2 is arranged in the mold member 5 between the connection portions 3a and 4b of the lead terminals 3 and 4 so that the direction of the length LT1 of the chip body 6 corresponds to the direction in which the connection portions 3a and 4b of the lead terminals 3 and 4 extend. Thus, in this arrangement of the capacitor element 2, the direction of projection of the anode bars 7 (orientation C1 of the capacitor element 2) corresponds to the width direction of the mold member 5.

Each of the anode bars 7 of the capacitor element 2 has a projecting end fixedly and electrically connected (electrical conduction) to the connection portion 3a of the anode lead terminal 3 by using conductive paste or cream solder (not shown) The cathode-side surface 6b of the chip body 6, which is on the opposite side of the anode bars 7, is fixed to the connection portion 4b of the cathode lead terminal 4 by using conductive paste or cream solder (not shown) so that the cathode film 8 on the chip body 6 is electrically connected to the cathode lead terminal 4.

Figure 4:
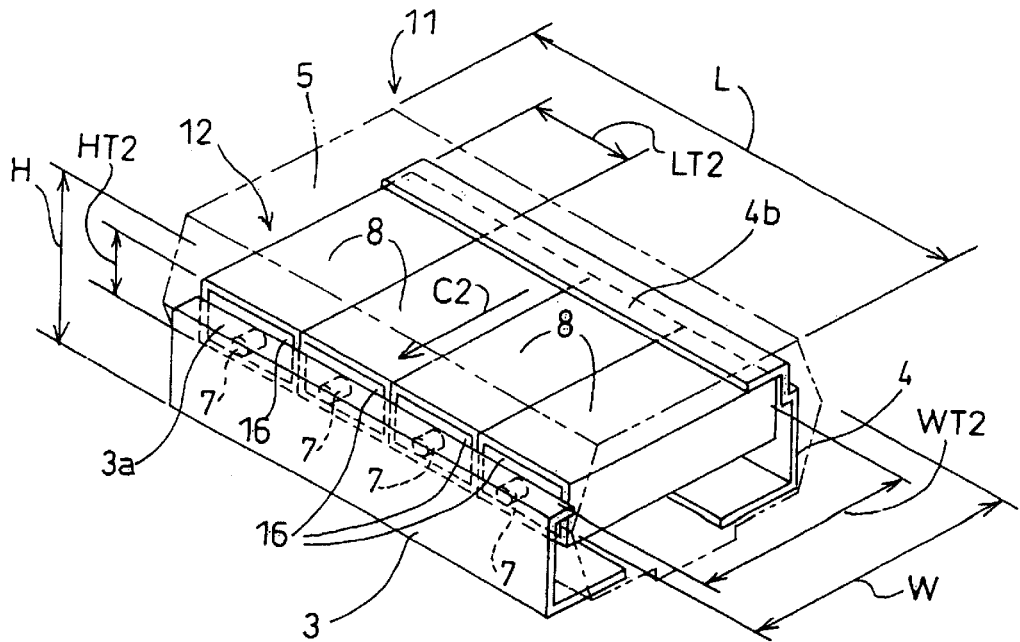
FIG. 4 is a perspective view of a solid electrolytic capacitor of a second embodiment in a state in which the mold member is removed.
Figure 5:
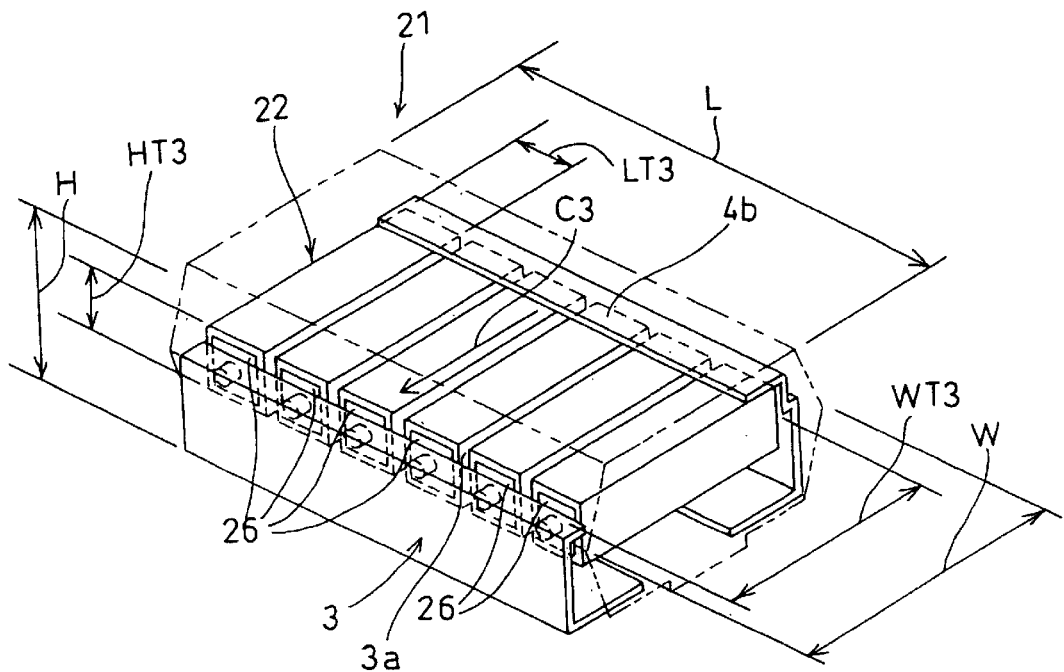
FIG. 5 is a perspective view of a solid electrolytic capacitor of a third embodiment in a state in which the mold member is removed.
Figure 6:
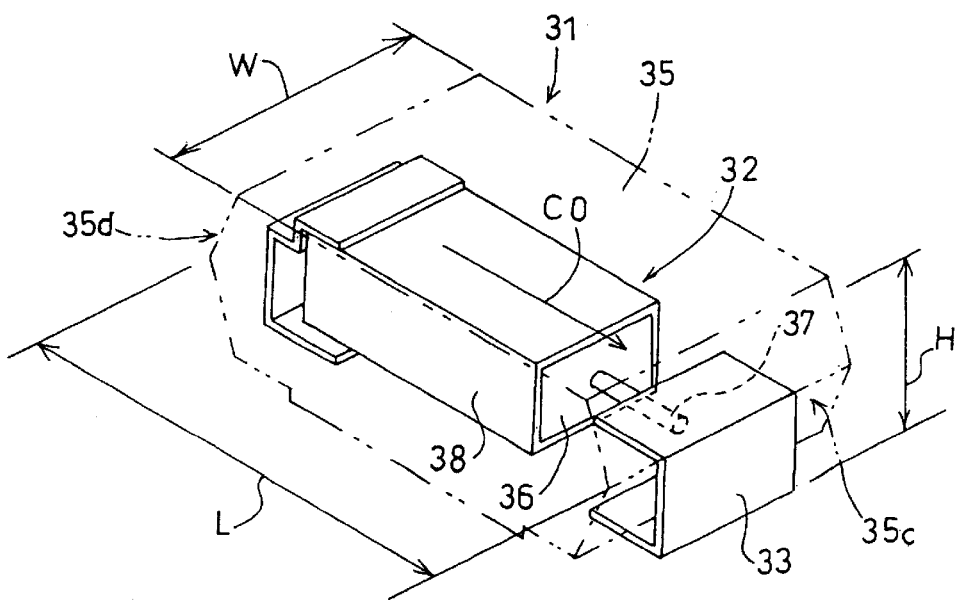
FIG. 6 is a perspective view of a prior art solid electrolytic capacitor in a state in which the mold member is removed.

FIG. 4 shows a solid electrolytic capacitor according to a second embodiment of the present invention, whereas FIG. 5 shows a solid electrolytic capacitor according to a third embodiment of the present invention. In these embodiments, the elements whose structure and effect do not differ from those of the first embodiment are designated by the same reference signs as those used for the first embodiment, and the detailed description thereof is omitted.

In the solid electrolytic capacitor 11 of the second embodiment shown in FIG. 4, the capacitor element 12 includes a plurality of chip pieces 16 (four pieces in FIG. 4) juxtaposed in the direction of the length L of the mold member 5. Each of the chip pieces 16 has an end surface from which an anode bar 7 projects.

Similarly to the first embodiment, a dielectric film (not shown) having high insulation property is formed on the surfaces of the metal particles included in each of the chip pieces 16. Further, a cathode film 8 is formed on a solid electrolytic layer (not shown) at the outer surfaces of the chip piece 16 except for the end surface from which the anode bar 7 projects.

The chip pieces 16, which are juxtaposed in the direction of the length L of the mold member 5, are arranged in close contact with each other so that the respective cathode films 8 of adjacent chip pieces 16 are electrically connected to each other. Alternatively, the chip pieces 16 may be appropriately spaced from each other in the direction of the length L of the mold member 5. In the second embodiment, the size of each chip piece 16 is length LT2×width WT2×height (thickness) HT2=about 1.6 mm×about 3.5 mm×about 1.0 mm.

The capacitor element 12 is arranged in the mold member 5 between the connection portions 3a and 4b of the lead terminals 3 and 4 so that the juxtaposing direction of the chip pieces 16 corresponds to the direction in which the connection portions 3a and 4b of the lead terminals 3 and 4 extend. In the second embodiment again, similarly to the first embodiment, the orientation C2 of the capacitor element 12 (projecting direction of the anode bars 7) corresponds to the width direction of the mold member 5.

The anode bar 7 provided at each of the chip pieces 16 has a projecting end fixedly and electrically connected (electrical conduction) to the connection portion 3a of the anode lead terminal 3 by using conductive paste or cream solder (not shown). The end surface of each chip piece 16, which is on the opposite side of the anode bars 7, is fixed to the connection portion 4b of the cathode lead terminal 4 by using conductive paste or cream solder (not shown) so that the cathode films 8 of the chip pieces 16 are electrically connected to the cathode lead terminal 4.

The solid electrolytic capacitor 21 of the third embodiment shown in FIG. 5 differs from that of the second embodiment in that the number of chip pieces 26 (six pieces in FIG. 5) is greater than that of the second embodiment and that the chip pieces 26 are appropriately spaced from each other in the direction of the length L of the mold member 5. In the third embodiment, the size of each chip piece 26 is length LT3×width WT3×height (thickness) HT3=about 0.9 mm×about 3.5 mm×about 1.0 mm. Similarly to the first and the second embodiments, the orientation C3 of the capacitor element 22 (projecting direction of the anode bars 7) corresponds to the width direction of the mold member 5. Other structures are the same as those of the second embodiment.

The solid electrolytic capacitors 1, 11, 21 and 31 having the structures described above were examined for the capacitance, equivalent series resistance (ESR) and equivalent series inductance (ESL), and the measurements given in Table 1 below were obtained. With respect to both of the embodiments of the invention and the prior art, the capacitance was measured under the conditions of 120 Hz frequency at 20° C., the equivalent series resistance was measured under the conditions of 100 kHz frequency at 20°

C., and the equivalent series inductance was measured under the conditions of 400 kHz frequency at 20° C.

As is clear from the measurements given in Table 1, the equivalent series inductance (ESL) of the solid electrolytic capacitors 1, 11 and 21 of the first through the third embodiments is lower than that of the prior art solid electrolytic capacitor 31. This is because the lead terminals 3 and 4 are respectively arranged at the longitudinally-extending side surfaces 5a and 5b of the mold member 35, and the orientation C1, C2 and C3 of the capacitor element 11, 21 and 31 corresponds to the direction of the width W of the mold member 5 which is shorter than the length L. Specifically, with such an arrangement, the distance through which the electric current flows between the lead terminals 3 and 4 is shorter than in the prior art structure in which the orientation C0 of the capacitor element 32 is set to the direction of the length L of the mold member 35, whereby the lower equivalent inductance is provided.

The equivalent-series-inductance reducing effect improved for the first embodiment, the second embodiment and the third embodiment in the mentioned order. In the first embodiment, plural anode bars 7 projecting from the single chip body are connected to the anode lead terminal 3, and in the equivalent circuit, a plurality of sources of inductance (anode bars 7) is connected to a single capacitor (chip body 6). On the other hand, in the second embodiment, plural sets of sources of inductance (anode bars 7) and capacitors (chip bodies 6) are connected in parallel in the equivalent circuit. Therefore, the equivalent-series-inductance reducing effect of the second embodiment is larger than that of the first embodiment.

Since the number of the sets of an anode bar 7 and a chip piece 26 in the third embodiment is greater than in the second embodiment, the combined equivalent series inductance in the third embodiment is lower than that in the second embodiment. Therefore, the equivalent-series-inductance reducing effect of the third embodiment is the highest.

Further, the equivalent series resistance (ESR) of the solid electrolytic capacitors 1, 11 and 21 of the first through the third embodiments is also lower than that of the prior art solid electrolytic capacitor 31.

In the first embodiment, plural anode bars 7 are connected to the anode lead terminal 3, and in the equivalent circuit, the combinations of each anode bar 7 and the chip body 6 are connected in parallel. Therefore, the combined equivalent series resistance of the first embodiment became lower than that of the prior art solid electrolytic capacitor.

Moreover, the equivalent-series-resistance reducing effect also improved for the first embodiment, the second embodiment and the third embodiment in the mentioned order. In the second and the third embodiments, the chip body of the capacitor element 2 is made up of a plurality of chip pieces 16 (26) juxtaposed in the direction of the length L of the mold member 5. Therefore, of the solid electrolytic layer on the chip pieces 16 (26), the surface area of the portion which does not come into contact with the dielectric film on the metal particles is increased by as much as the surface area of the solid electrolytic layer located between adjacent chip pieces 16 (26). This is the reason why the equivalent series resistance improved in that order.

In the first through the third embodiments, a wide region of the cathode film 8 on the chip body 2 or the chip pieces 16 (26) is electrically connected to the connection portion 4b of the cathode lead terminal 4. Conceivably, this structure also contributes to the reduction of the equivalent series resistance.

The chip body 6 of the first embodiment is in the form of a flat plate elongated in the longitudinal direction of the mold member 5, and the chip pieces 16 (26) of the second and the third embodiment are juxtaposed in the longitudinal direction of the mold member 5 to become like a flat plate when viewed as a whole. With such structures, the chip body 6 or the chip pieces 16 (26) can be snugly housed in the mold member 5 of a standard size, while sufficient capacitance of the capacitor elements 2, 12, 22 is ensured.

Therefore, in any of the first through the third embodiments, an increase in size of the capacitor elements 2, 12, 22 (increase in size of the solid electrolytic capacitors 1, 11, 21) to exceed the size of a standard mold member 5 can be avoided. Conceivably, the reason why the capacitances in the second and the third embodiments are slightly lower than that in the first embodiment is that the total volume of the chip pieces 16 (26) is slightly smaller than the volume of the chip body 2 of the first embodiment.

In this way, with the structures of the solid electrolytic capacitors 1, 11 and 21 of the foregoing embodiments, both of the equivalent series resistance (ESR) and the equivalent series inductance (ESL) between the lead terminals 3 and 4 can be reduced while ensuring the capacitance of the capacitor elements 2, 12 and 22 as much as possible, and the performance of the solid electrolytic capacitors 1, 11, 21 at a high frequency range can be considerably improved.

The present invention can be embodied in various ways other than the illustrated embodiments. For example, the chip body or the set of chip pieces as a whole is not limited to the configuration like a flat plate but may have any other sectional configuration (such as a polygonal section) as long as it is elongated in the longitudinal direction of the mold member. The length L, width W and height H of the mold member can be appropriately set in accordance with the conventional case standard (J, P, A, B, C case and the like), and the size and configuration of the capacitor element can be changed correspondingly. As noted above, although the use of a single anode bar is acceptable, the provision of a plurality of anode bars promotes the equivalent-series-resistance reducing effect and the equivalent-series inductance reducing effect.

TABLE 1

|  | Capacitance (120 Hz/20° C.) (μF) | Equivalent Series Resistance(ESR) (100 kHz/20° C.) (mΩ) | Equivalent Series Inductance(ESL) (400 kHz/20° C.) (nH) |
| --- | --- | --- | --- |
| Prior Art | 470 | 15 | 5 |
| 1st Embodiment | 470 | 5 | 1 |
| 2nd Embodiment | 430 | 2 | 0.5 |
| 3rd Embodiment | 390 | 1 | 0.2 |

The invention claimed is:

1. A solid electrolytic capacitor comprising: a capacitor element including a chip body made of valve metal, an anode bar projecting from a side surface of the chip body, a cathode film formed on the chip body without covering said side surface of the chip body; an anode lead terminal connected to the anode bar; a cathode lead terminal connected to the cathode film on the chip body; and a mold member packaging the capacitor element with said two lead terminals exposed, the mold member being in a form of a generally rectangular parallelepiped whose length is greater than width and height;

wherein the mold member includes two lengthwise-extending side surfaces and two widthwise-extending side surfaces, the two lengthwise-extending side surfaces being longer than the two widthwise-extending side surfaces, the anode lead terminal is extending out from one of the two lengthwise-extending side surfaces of the mold member, the cathode lead terminal extending out from the other of the two lengthwise-extending side surfaces of the mold member, and wherein the capacitor element is arranged between the lead terminals so that the anode bar projects in a widthwise direction of the mold member.

2. The solid electrolytic capacitor according to claim 1, wherein the chip body of the capacitor element is in a form of a generally rectangular parallelepiped elongated in a lengthwise direction of the mold member.

3. The solid electrolytic capacitor according to claim 2, wherein each of the lead terminals is elongated in the lengthwise direction of the mold member, wherein said side surface of the chip body comprises one of two lengthwise-extending side surfaces of the chip body, and wherein a plurality of anode bars are provided to project from said side surface of the chip body and spaced from each other in the lengthwise direction of the mold member.

4. The solid electrolytic capacitor according to claim 2, wherein each of the lead terminals is elongated in the lengthwise direction of the mold member, wherein the capacitor element includes a plurality of chip bodies juxtaposed to each other in the lengthwise direction of the mold member, and wherein each of the chip bodies is provided with a respective anode bar projecting therefrom.

5. A solid electrolytic capacitor comprising: a chip body which is made of valve metal, the chip body being formed with a cathode film and including an anode-side surface from which a plurality of anode bars projects; an anode lead terminal connected to the anode bars; a cathode lead terminal connected to the cathode film of the chip body; and a mold member packaging the chip body with the lead terminals partially exposed, the mold member being in a form of a generally rectangular parallelepiped whose length is greater than width and height;

wherein the mold member includes lengthwise-extending first and second side surfaces as well as widthwise-extending third and fourth side surfaces, the lengthwise-extending first and second side surfaces being longer than the widthwise-extending third and fourth side surfaces, the anode lead terminal extending out from the first side surface of the mold member, the cathode lead terminal extending out from the second side surface of the mold member, and wherein the chip body is arranged between the lead terminals so that the anode bars project in a widthwise direction of the mold member.

6. A solid electrolytic capacitor comprising: a plurality of chip bodies each of which is made of valve metal, each of the chip bodies being formed with a cathode film and including an anode-side surface from which an anode bar projects; an anode lead terminal connected to the anode bars of the chip bodies; a cathode lead terminal connected to the cathode films of the chip bodies; and a mold member packaging the chip bodies with the lead terminals partially exposed, the mold member being in a form of a generally rectangular parallelepiped whose length is greater than width and height;

wherein the mold member includes lengthwise-extending first and second side surfaces as well as widthwise-extending third and fourth side surfaces, the lengthwise-extending first and second side surfaces being longer than the widthwise-extending third and fourth side surfaces, the anode lead terminal extending out from the first side surface of the mold member, the cathode lead terminal extending out from the second side surface of the mold member, and wherein the chip bodies are juxtaposed to each other between the lead terminals in a lengthwise direction of the mold member so that the anode bars project in a widthwise direction of the mold member.

* * * * *